United States Patent [19]
Teramachi et al.

[11] Patent Number: 5,755,516
[45] Date of Patent: May 26, 1998

[54] ROLLING GUIDE APPARATUS AND METHOD OF MANUFACTURING MOVABLE BLOCK OF ROLLING GUIDE APPARATUS

[75] Inventors: Hiroshi Teramachi, Tokyo; Takeki Shirai, Chiba, both of Japan

[73] Assignee: THK Co., Ltd., Tokyo, Japan

[21] Appl. No.: 788,352

[22] Filed: Jan. 27, 1997

Related U.S. Application Data

[63] Continuation of Ser. No. 569,125, filed as PCT/JP95/00974 May 22, 1995, abandoned.

Foreign Application Priority Data

May 20, 1994 [JP] Japan ..................... 6-131266

[51] Int. Cl.⁶ ..................... F16C 29/06; F16C 43/04
[52] U.S. Cl. ..................... 384/45; 29/898.03
[58] Field of Search ..................... 384/45, 43, 49; 29/898.03

[56] References Cited

U.S. PATENT DOCUMENTS

| | | | |
|---|---|---|---|
| 4,932,067 | 6/1990 | Pester et al. | 384/45 |
| 4,932,279 | 6/1990 | Kasuga | 384/45 X |
| 4,934,834 | 6/1990 | Morita | 384/45 |
| 5,082,374 | 1/1992 | Narumiya | 384/45 |

FOREIGN PATENT DOCUMENTS

| | | |
|---|---|---|
| 63-225719 | 9/1988 | Japan . |
| 64-25526 | 2/1989 | Japan . |
| 4-132219 | 12/1992 | Japan . |

*Primary Examiner*—Thomas R. Hannon
*Attorney, Agent, or Firm*—Armstrong, Westerman, Hattori, McLeland & Naughton

[57] ABSTRACT

At least a ball escape hole (10) of a ball circulation passage (7) is formed of a molded body (12) and the molded body (12) is formed integrally with a block body (13) having high rigidity through an insert molding process, thereby eliminating a drilling working, possibly reducing assembling processes and reducing generation of noise.

It is preferred that the molded body (12) is provided with an inner peripheral portion of a direction changing passage (11) integrally connected with the ball escape hole (10) and joined with both end surfaces of the block body (13).

Furthermore, it is preferred that the molded body (12) is provided with a retainer (17) extending along a loaded ball passage (8) and integrally connected, at its both ends, with the inner peripheral portion of the direction changing passage (11), thereby providing a closed sectional shape surrounded by the ball escape hole portion (10), the direction changing portion (11) and the retainer portion (17).

17 Claims, 9 Drawing Sheets

ROLLING GUIDE APPARATUS AND METHOD OF MANUFACTURING MOVABLE BLOCK OF ROLLING GUIDE APPARATUS

This application is a continuation of application Ser. No. 08/569,125 filed Apr. 3, 1996, now abandoned; which is a 371 of PCT/JP95/00974 filed May 22, 1995.

TECHNICAL FIELD

The present invention relates to a rolling guide apparatus of contact-type for guiding a rolling member along a linear passage or the like, more particularly, to a structure of a rolling member circulation passage and also relates to a method of manufacturing a movable block of the rolling guide apparatus.

BACKGROUND ART

A conventional rolling guide apparatus of this type generally has a structure in which a movable block is supported to be movable along a guide rail through a number of rolling members, the movable block is provided with a circulation passage through which the rolling members are guided and circulated. The rolling member circulation passage is formed with a loaded rolling member rolling passage composed of loaded rolling member rolling grooves formed to opposing surfaces of the movable block and the guide rail, respectively, and is formed with a return passage formed to a non-loaded area and connected at their both end portions with the loaded rolling member rolling passage so that the rolling member circulates the loaded rolling member rolling passage and the return passage. The return passage is composed of a rolling member escape hole extending in parallel to the loaded rolling member rolling passage and a direction changing passage connecting both end portions of the rolling member escape hole to both ends of the loaded rolling member rolling passage to change the rolling direction of the rolling member.

In the conventional structure, however, the rolling member escape hole is formed through a drilling working to a block body so as to penetrate it vertically, which requires a troublesome working and involves a factor of cost increasing.

In order to obviate this defect, a conventional technology has provided a structure in which a rolling member escape hole in a non-loaded area is formed by cutting away a side surface of the block body and the cut-out portion is covered by a cover member formed of a resin material, for example. However, according to this conventional structure, it is difficult to assemble the rolling member circulation passage, and noise is generated due to an assembling error, thus providing a problem.

Furthermore, in the conventional rolling guide apparatus, it is attempted to construct the block body to have a sufficient rigidity so as not to be deformed even if a heavy load is applied to the guide apparatus. On the contrary, in a case where there causes a large misalignment between the guide rail and the movable block (for example, an error in degree of parallelism between a fixing surface of the guide rail and a fixing surface of a conveyer table fixed to the movable block), an unnatural force is applied to a contact surface between the rolling member and the rolling member rolling groove. This unnatural force obstructs smooth rolling of the rolling member and, hence, the rolling member and the rolling member rolling groove are easily worn, providing a problem.

In view of this point, in the case of the structure in which the rolling member escape hole is formed by cutting away the outside surface of the block body, the block body has a reduced thickness portion corresponding to the cut-away portion and hence the rigidity thereof is lowered correspondingly. However, in the type of this structure, the rolling member contacts the cutout portion of the block body and then is covered by the cover member. Therefore, the thickness of the block body is not reduced to a thickness more than that corresponding to a gap between the rolling member escape hole and the loaded rolling member rolling groove and the rigidity is also not reduced correspondingly. However, the gap between the rolling member escape hole and the rolling member rolling groove is not so much reduced because of the smooth rolling direction changing of the rolling member. Thus, there is a limit to reduce the thickness of the block body.

The rolling member circulates the circulation passage formed in the loaded and non-loaded areas, and as far as the positional relationship of the rolling member escape hole with respect to the loaded rolling member rolling groove is not accurately decided, the direction changing passage between the loaded rolling member passage and the rolling member escape hole is not also accurately positioned. Further, in a case where the loaded rolling member rolling passage is not smoothly and continuously connected with the direction changing passage, the rolling member is not smoothly rolled and circulated therein.

Furthermore, a retainer is also disposed to both sides of the loaded rolling member rolling passage for preventing the rolling member from falling off at a time when the movable block is disassembled from the guide rail. It is necessary to form a gap between the retainer and the rolling member rolling passage so that the rolling member does not interfere with the retainer at a time when the rolling member rolls in and along the rolling member rolling passage, and because of this reason, it is necessary to accurately position the retainer with respect to the loaded rolling member rolling passage and it is also required for the passage to have an accurate linearity.

Still furthermore, in the conventional structure, respective members or elements assembled with the movable block body made of steel are often fastened by insufficient fastening force, and because of this reason, these members or elements resonate and generate noises, thus also providing a problem at a time of the rolling circulation of the rolling member particularly in the non-loaded area at which the rolling member is rolled with no load.

The present invention was conceived to solve the above problems and aims to provide a rolling guide apparatus which does not require a drilling working for a rolling member escape hole by integrally molding a block body and at least the rolling member escape hole through a molding process, assembling process can be possibly reduced and generation of noise during the rolling of the rolling member is effectively reduced, and also provide a method of manufacturing the movable block.

In addition to the above object, it is aimed to change the rigidity of the block body without changing a gap between the rolling member escape hole and the loaded rolling member rolling groove.

Furthermore, in addition to the above objects, it is aimed to ensure smooth circulation of the rolling member by accurately positioning the rolling member circulation passage with respect to the rolling member rolling groove.

DISCLOSURE OF INVENTION

The present invention relates to a rolling guide apparatus in which a movable block is supported to be movable along a guide rail through a number of rolling members, a circulation passage for guiding circulation of the rolling members is formed to the movable block, the rolling member circulation passage being composed of a loaded rolling member rolling passage in a loaded area between loaded rolling member rolling grooves formed to opposing surfaces of the movable block and the guide rail and a non-loaded return passage for returning the rolling members in the loaded area from one end of the loaded rolling member rolling passage to another one end thereof, the return passage being composed of a rolling member escape hole extending in parallel to the loaded rolling member rolling passage and a direction changing passage having inner and outer peripheral portions connecting both ends of the rolling member escape hole to both ends of the loaded rolling member rolling passage, and the rolling guide apparatus being characterized in that at least one of the rolling member escape hole, the inner peripheral portion of the direction changing passage and a retainer extending along the loaded rolling member rolling passage is formed of a molded body and the molded body is integrally formed with a block body having high rigidity.

The molded body may be composed of only the rolling member escape hole, only the inner peripheral portion of the direction changing passage or only the retainer, or composed of integral combination thereof.

That is, the molded body may be provided with the rolling member escape hole and the inner peripheral portion of the direction changing passage integrally connected to the rolling member escape hole and joined with both end surfaces of the block body.

The molded body may be provided with the rolling member escape hole and the retainer extending along the loaded rolling member rolling passage.

The molded body may be provided with the inner peripheral portion of the direction changing passage joined with both end surfaces of the block body and the retainer extending along the loaded rolling member rolling passage and integrally connected at its both ends with the inner peripheral portion of the direction changing passage.

The molded body may be provided with the rolling member escape hole, the inner peripheral portion of the direction changing passage integrally connected to the rolling member escape hole and joined with both end surfaces of the block body and the retainer extending along the loaded rolling member rolling passage and integrally connected at its both ends with the inner peripheral portion of the direction changing passage, the molded body having a closed sectional shape surrounded by the rolling member escape hole, the direction changing passage and the retainer.

Furthermore, a recess-protrusion engaging portion is formed to joining surfaces of the molded body and the block body.

The molded body is formed of a resin material, and a portion between the loaded rolling member rolling groove and the rolling member escape hole of the movable block is formed as one portion of the resin molded body so as to define a reduced thickness in the block body having high rigidity to provide an elastic property.

It is effective that the rolling members rolling in the loaded rolling member rolling passage are scooped by a guide, each in two point contact state, extending in the loaded area of the direction changing passage from the loaded rolling member rolling groove to the direction changing passage in a manner of being separated gradually from each other.

It is further characterized that the movable block is provided with a pair of leg portions between which the guide rail is interposed and a connection portion connecting the leg portions, and the rolling member circulation passages are formed to the leg portions.

It is characterized that a covering portion is provided for covering at least one of upper and lower surfaces of the connection portion of the movable block and the covering portion is integrally formed with the inner peripheral portion of the direction changing passage joined with both the end surfaces of the block body.

The rolling member escape hole has a sectional shape having a rolling member passing section through which the rolling member passes and a lubrication agent storing section capable of storing a lubrication agent bled outward from the rolling member passing section.

In another aspect, the present invention relates to a method of manufacturing a movable block, which is supported to be movable with respect to a guide rail through a number of rolling members, of a rolling guide apparatus provided with loaded rolling member rolling grooves formed to opposing surfaces of the movable block and the guide rail, a rolling member escape hole extending in parallel to the loaded rolling member rolling grooves, and a direction changing passage having inner and outer peripheral portions connecting both ends of the rolling member escape hole with both ends of the loaded rolling member rolling passage, the manufacturing method being characterized in that the block body is placed in a mold, and at least one of the rolling member escape hole, the inner peripheral portion of the direction changing passage and a retainer extending along the loaded rolling member rolling passage is formed integrally with the block body through an insertion molding process.

The rolling member escape hole and the inner peripheral portion of the direction changing passage may be integrally formed together through the insertion molding process.

The rolling member escape hole and the retainer extending along the loaded rolling member rolling passage may be integrally formed together through the insertion molding process.

The inner peripheral portion of the direction changing passage and the retainer extending along the loaded rolling member rolling passage may be integrally formed together through the insertion molding process.

The rolling member escape hole, the inner peripheral portion of the direction changing passage, and the retainer extending along the loaded rolling member rolling passage may be integrally formed together through the insertion molding process.

The block body is positioned in the mold with reference to the rolling member rolling groove formed to the movable block.

According to the present invention, since the rolling member escape hole is integrally formed with the block body through the molding process, the drilling working can be eliminated to thereby easily form the structure.

Particularly, since the rolling member escape hole forming portion is integrally formed in the non-loaded area with the molded body, noise which will be caused by an insufficient fastening force can be prevented from generating.

The degree of integral formation can be increased by integrally forming the inner peripheral portion of the direction changing passage with the rolling member escape hole, making easy the assembling process.

Furthermore, by integrally forming the rolling member escape hole, the inner peripheral portion of the direction changing passage and the retainer, the tensile stress is applied, by the shrinkage of the molded portions, to the rolling member escape hole, so that the fastening force can be increased by the remaining tensile stress, thus remarkably reducing the generation of the noise.

Particularly, with respect to the retainer, the degree of straightness can be made high by the function of the remaining tensile stress, so that the retainer is made parallel and straight with respect to the loaded rolling member rolling passage, and as a result, when the loaded rolling member is rolled and moved, the retainer does not contact and interfere with the rolling member and the rolling member is hence rolled smoothly and the movable block is also smoothly moved along the guide rail.

Furthermore, since the retainer is firmly secured to the block body through the tensile stress, no resonance is caused by the rolling vibration of the rolling member, thus remarkably reducing the noise.

Further, the thickness of the block constituting material such as metal constituting the block body at its portion between the loaded rolling member rolling groove to the rolling member escape hole which affects on rigidity thereof can be made thin so as to provide an elastic property without changing the dimension between the rolling member rolling groove and the rolling member escape hole, in other words, with the dimension suitable for the smooth direction changing operation being maintained, by forming the rolling member escape hole by the molded resin body.

Accordingly, if an assembling error between the guide rail and the movable block (for example, misalignment such as assembling error due to an error in parallelism between the fixing surface of the guide rail and the fixing surface of a conveyer table to be fixed to the movable block) be caused, such error can be absorbed through the flexibility of the thin portions of the block body and the contact portion between the rolling member and the rolling member rolling groove is prevented from being applied with an excessive force.

The rolling member escape hole is formed so as to provide a sectional shape having a rolling member passing section along which the rolling members roll and a lubrication agent storing section capable of storing lubrication agent bled outward from the rolling member passing section, and according to such structure of the rolling member escape hole, since the lubrication agent can be retained without obstructing the circulating motion of the rolling member, the smooth circulating motion thereof can be surely maintained for the long time operation with no substantial maintenance. Furthermore, the escape hole having such complicated sectional shape can be easily formed through the molding process.

The positioning of the block body inserted into the mold is performed with reference to the rolling member rolling groove through the insertion molding process, and accordingly, since the position of the rolling member escape hole and the position of the retainer can be determined with reference to the rolling member rolling groove, the relative positional relationship among the loaded rolling member rolling passage, the direction changing passage and the escape hole constituting the rolling member circulation passage can be exactly determined. Accordingly, no staged portion is formed to the connection portion between the loaded rolling member rolling passage, the inner peripheral portion of the direction changing passage and the rolling member escape hole, thus smoothly circulating the rolling members.

Furthermore, when the position of the block body in the mold is determined, the contacting portion of the mold with the block body is minimally limited to the rolling member rolling groove by positioning it with reference to the rolling member rolling groove, and the other portions of the mold can be maintained with non-contact state, which requires no precise working, thus easily performing manufacturing process.

BRIEF DESCRIPTION OF DRAWINGS

FIGS. 1 through 5 shows a rolling guide apparatus according to one embodiment of the present invention, in which.

FIGS. 3A-3K show a disassembled perspective view of the block body and a molded body of the movable block of the rolling guide apparatus of FIG. 1;

FIGS. 4a-4k shows the movable block body of the rolling guide apparatus of FIG. 1, in which FIG. 5 shows a side cover of the rolling guide apparatus of FIG. 1, in which

FIGS. 6a-6c is a view showing a manufacturing process of the movable block of the rolling guide apparatus of the present invention.

FIG. 7 shows a rolling guide apparatus according to another embodiment of the present invention, in which

FIG. 8 shows a structure of a further rolling guide apparatus utilizing the endless type retainer of FIG. 7, in which

BEST MODE FOR EMBODYING INVENTION

The present invention will be described hereunder by way of the embodiments shown in the accompanying drawings.

Figure 1A:
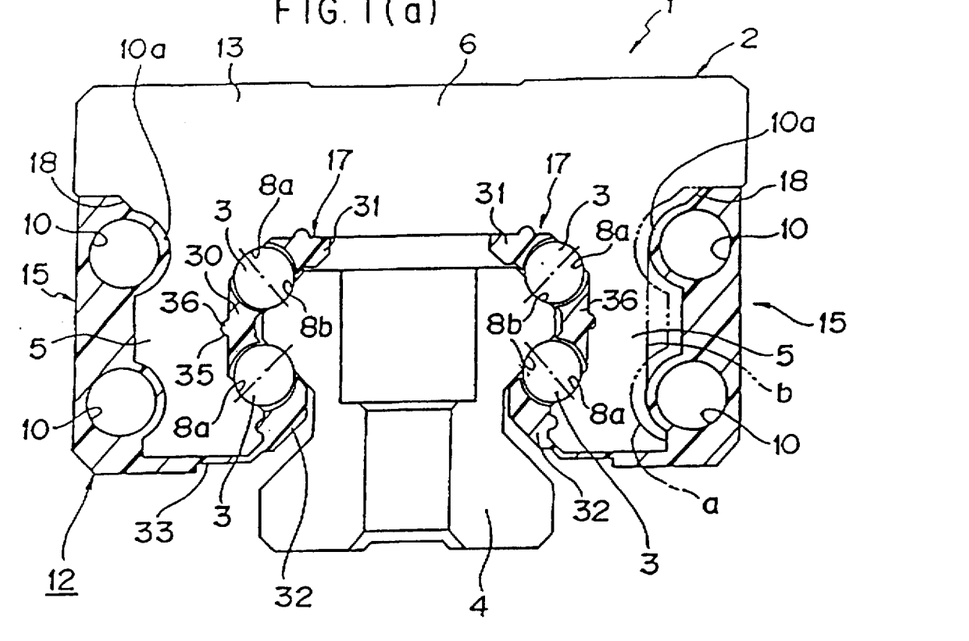
FIG. 1(a) is a vertical sectional view and FIGS. 1(b) to 1(d) show structures of a ball circulation passage.
Figure 1B:
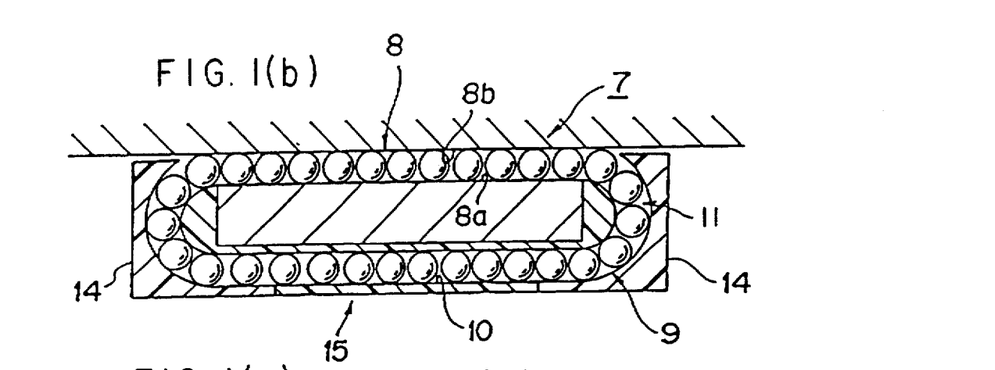
Figure 1C:
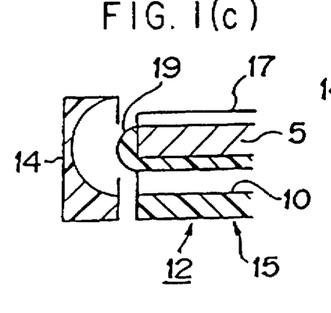
Figure 1D:
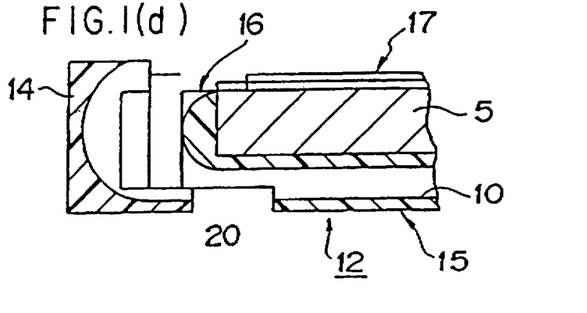
Figures 2A, 2B:
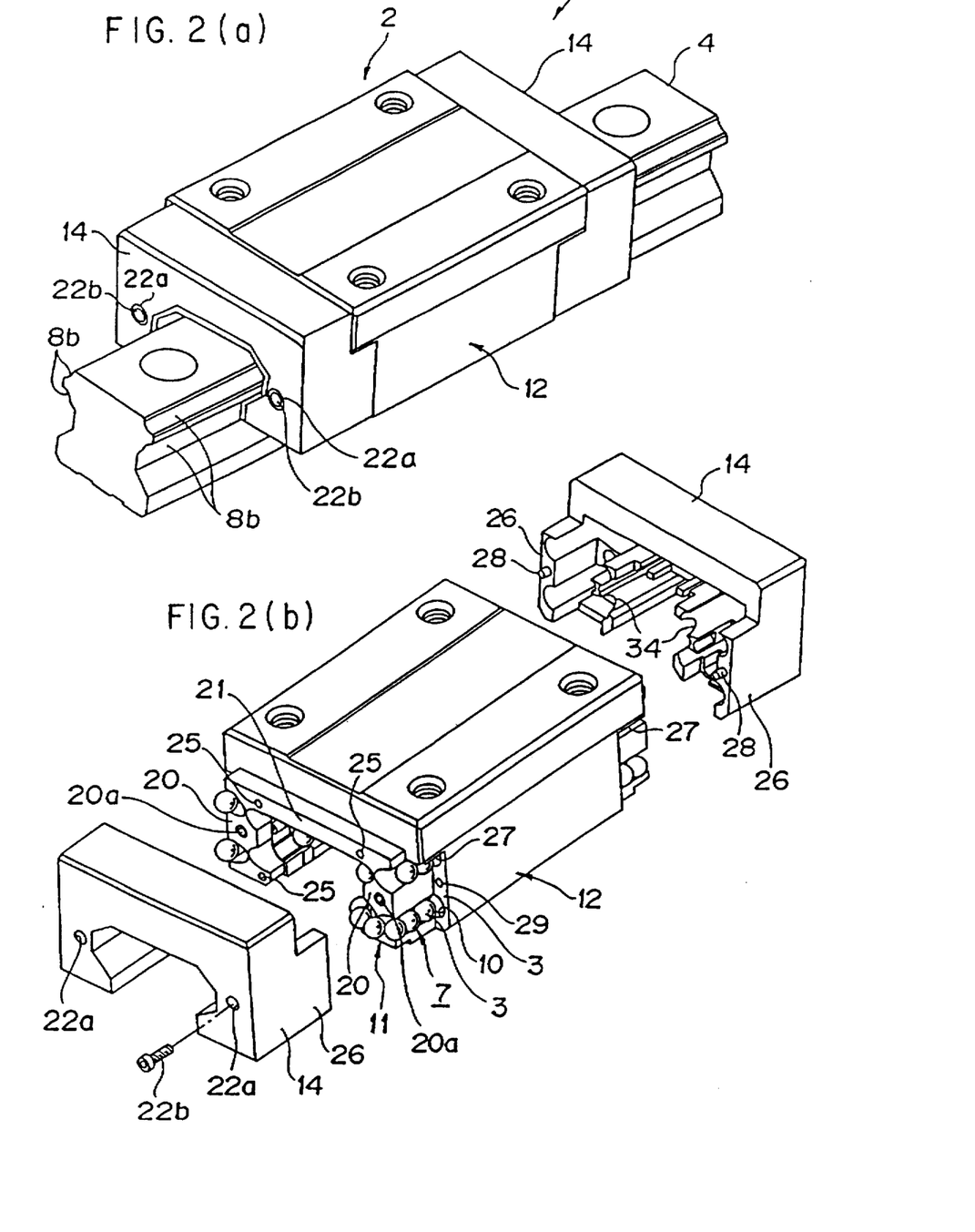
FIG. 2(a) is a perspective view of an outer appearance of the rolling guide apparatus of FIG. 1
FIG. 2(b) is a disassembled perspective view of a movable block.

FIGS. 1 and 2 represent a rolling guide apparatus of one embodiment according to the present invention.

The rolling guide apparatus 1 has a structure in which a movable block 2 is supported, through a plurality of balls as rolling members, by a guide rail 4 to be movable therealong.

The movable block 2 has a ]-shape in section and is provided with a pair of leg portions 5, 5 between which the guide rail 4 is interposed and a horizontal portion 6 to which the leg portions 5, 5 are rigidly connected.

Four ball circulation passages 7 for guiding a number of balls 3 are formed to the movable block 2. In the illustrated example, two pairs of upper and lower circulation passages 7 are formed to the bilateral leg portions 5, 5, respectively.

Each of the respective ball circulation passages 7 is composed of a loaded ball rolling passage 8 defined by loaded ball rolling grooves 8a, 8b respectively formed to the opposing surfaces of the movable block 2 and the guide rail 4 and a return passage 9, formed in a non-loaded area, for returning the balls 3 from one end of the loaded ball rolling passage 8 to the other one end thereof.

Contact lines showing directions of contact angles of the four rows of the loaded balls incline in directions to be closed with respect to horizontal line towards the center of the guide rail 4. In such structure, the contact line means a line connecting contact portions of the balls contacting to the ball rolling grooves of the movable block and the guide rail, and the term "contact line" used hereinafter means the same content.

The return passage 9 formed to the non-loaded area is composed of a ball escape hole 10 extending in parallel to the loaded ball rolling passage 8 and a ball rolling direction changing passage 11 connecting both ends of the ball escape hole 10 to both the ends of the loaded ball rolling passage 8. The direction changing passage 11 is composed of an end surface cover portion 16 integrally joined with the end surface of a high rigid movable block body 13, to which the loaded ball rolling passage is formed, and a side cover 14 as an outer periphery constituting member.

In the illustrated embodiment, an escape hole forming portion 15 to which the ball escape hole 10 of the ball circulation passage, the end surface cover portion 16 and a retainer 17 extending along the loaded ball rolling passage are formed with a resin molded body 12 integrally with the high rigid block body 13.

The escape hole forming portions 15 are joined integrally with cutouts 18, substantially rectangular in section, formed to the bilateral side surfaces of the metallic block body 13, and the two rows of the upper and lower ball escape holes 10 are independently formed with space. Each of the ball escape holes 10 is entirely peripherally surrounded by the escape hole forming portion 15. In the illustrated embodiment, an inside portion 10a of the ball escape hole 10 is formed in arc shape, and this inside portion 10a is integrally connected with the end surface cover portion 16 integrally joined to the end surface of the block body 13.

The most simple structure of the end surface cover portion 16 is shown in FIG. 1(c) and comprises only an inner peripheral portion 19 of each of the direction changing passages which is connected with the inside portion 10a of the ball escape hole 10, but in the present embodiment, a staged protruded portion 20 fitted to the side cover 14 is formed, and an inner periphery guide surface 11a of the direction changing passage is formed in shape of recess to the staged protruded portion 20. Further, a central staged protruded portion 21 is formed to the end surface of the horizontal portion 6 of the block body 13 so as to connect the bilateral staged protruded portions 20, 20.

Recess-protrusion engaging portions 23 are formed to surfaces to be joined of the bilateral staged protruded portions 20 and the end surface of the block body 13 for preventing the mold forming member and the block body from positionally shifting from each other through their recess-protrusion engagement. Each of these recess-protrusion engaging portions 23 is composed of a recess 23a formed to the end surface of the block body 13 and a protrusion 23b fitted to the recess 23a.

Screw tap holes 20a are formed to the end surfaces of the bilateral staged protruded portions 20 for fastening the side covers 14. These screw tap holes 20a are formed to the end surfaces of the molded body 12, and on the other hand, tap prepared holes each having a diameter smaller than that of the tap hole 20a are formed, through resin formation, to the end surfaces of the block body 13 to positions corresponding to the screw tap holes 20a, respectively, and screw tap holes 20a are also formed to these prepared holes. The side covers 14 are formed with bolt insertion holes 22a through which bolts 22 are inserted and screw engaged with the screw tap holes 20a, thereby fastening the side covers 14.

The staged protruded portions 20 and the central protruded portion 21 are both formed with positioning holes 25 at their end faces at portions near the ball rolling direction changing portions 11, and the side covers 14 are formed with positioning projections 24, at their end surfaces, at portions near the ball rolling direction changing portions 11 corresponding to the positioning holes 25. These positioning projections 24 and holes 25 are engaged with each other when these members are joined together, whereby the outer peripheral side of the ball rolling direction changing portion 11 on the side cover side and the inner peripheral side of the ball rolling direction changing portion 11 on the mold forming member side of the block body 13 can be surely positioned.

The inner periphery of the ball escape hole 10 may have a simple circular section having a diameter slightly larger than that of the rolling ball, but a guide projection 10b as shown in FIG. 3(c) will be provided for constituting three-point contact structure, or a spline shape guide projection 10c as shown in FIG. 3(b) may be provided. Since the position of the ball is determined by three point support structure, it is desired to provide the guide projections contacting the ball at more than three points and portions other than the projections 10b and 10c may be formed as escape. It is desired that the gap between the ball outer periphery and a virtual circle connecting the tip ends of the projections 10b and 10c is made small so as to be approximately equal to the diameter of the ball.

According to this structure, the balls 3 are guided by the tip ends of these projections, thus preventing meandering motion of the balls 3.

Furthermore, a lubrication agent such as grease in the ball escape hole 10 stays in a portion between the guide projections 10b and 10c, and accordingly, resistance caused by the lubrication agent during the rolling motion of the balls 3 through the escape holes 10 can be made small, thus the balls 3 being smoothly rolled with less obstruction of the lubrication agent.

Figures 3A, 3D:
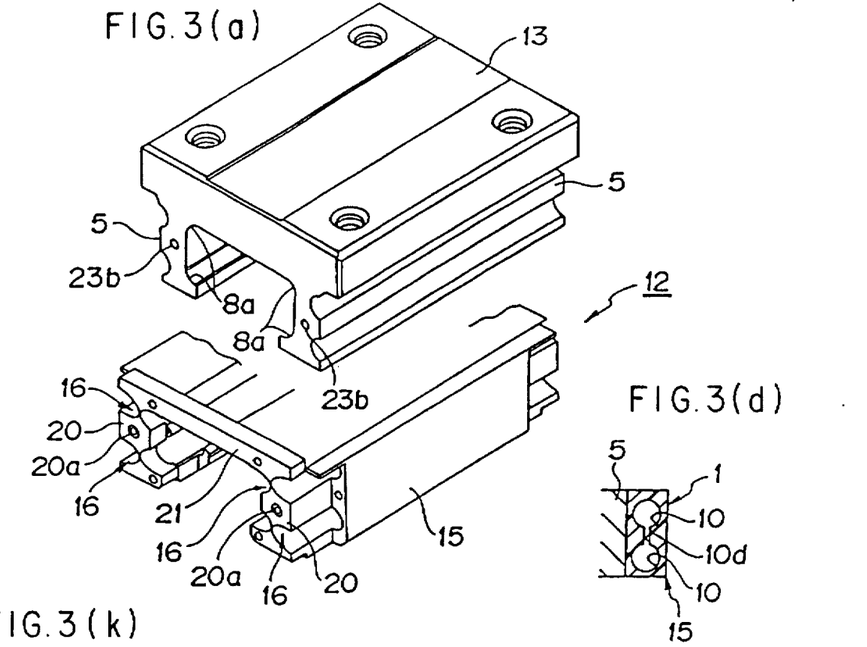
Figures 3B, 3C, 3E, 3F, 3G, 3H, 3I, 3J, 3K:
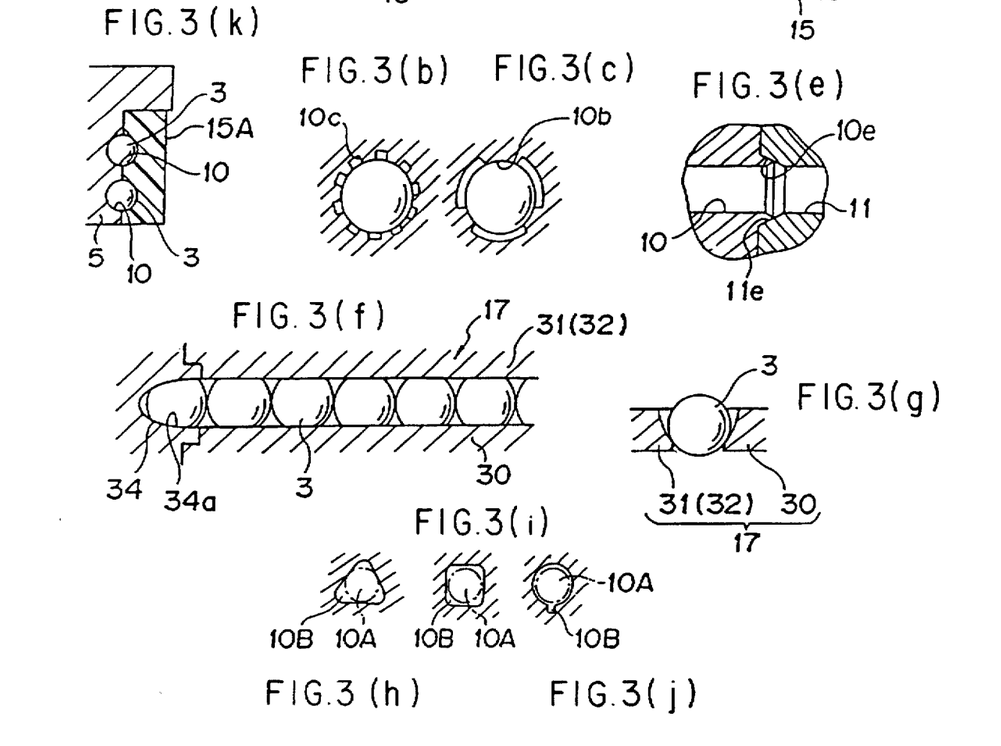
Figure 4A:
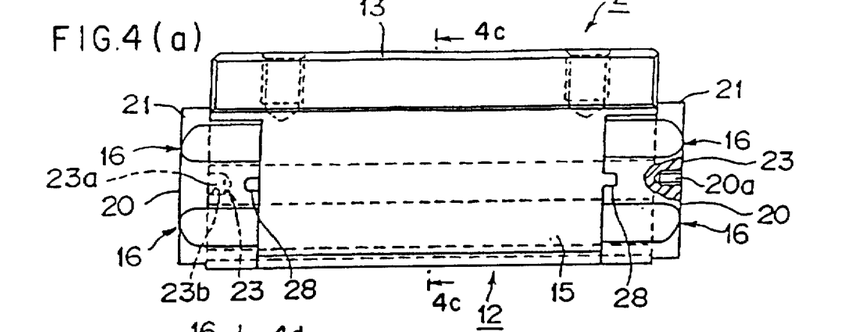
FIG. 4(a) is a front view.
Figure 4B:
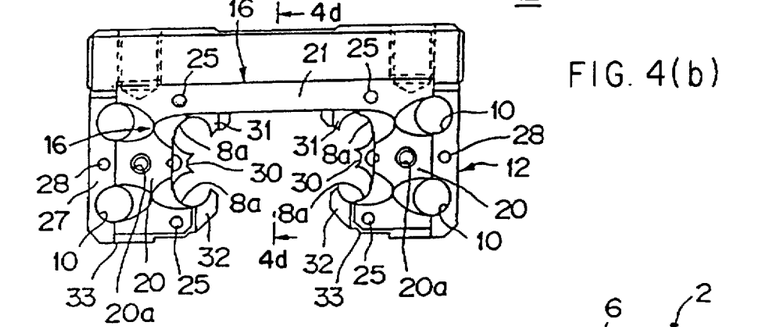
FIG. 4(b) is a side view.
Figures 4C, 4D:
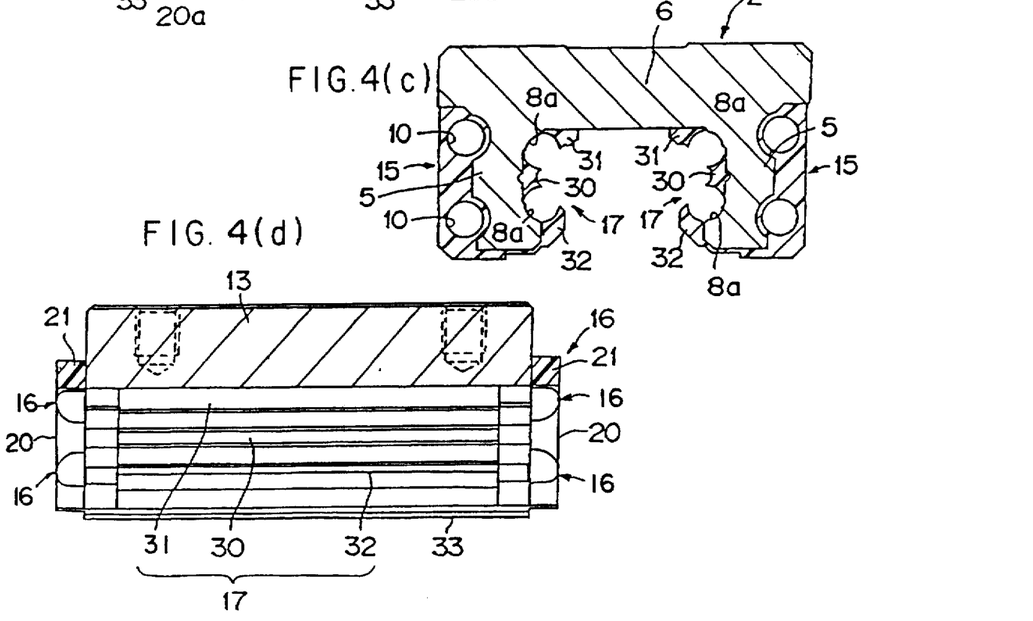
FIG. 4(c) is a sectional view taken along the line C—C of FIG. 4(a) and FIG. 4(d) is a sectional view taken along the line D—D of FIG. 4(b)
Figure 5A:
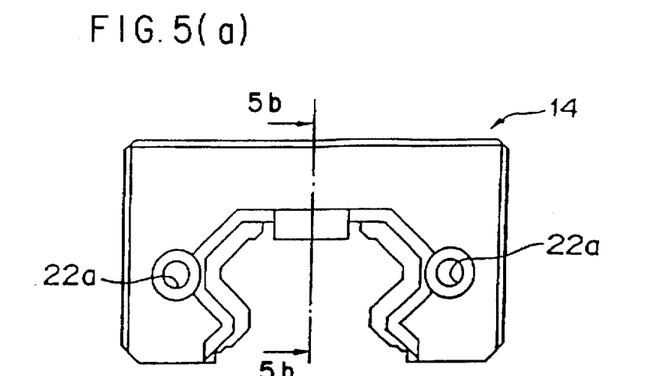
FIG. 5(a) is a front view.
Figures 5B, 5C, 5D, 5E, 5F:
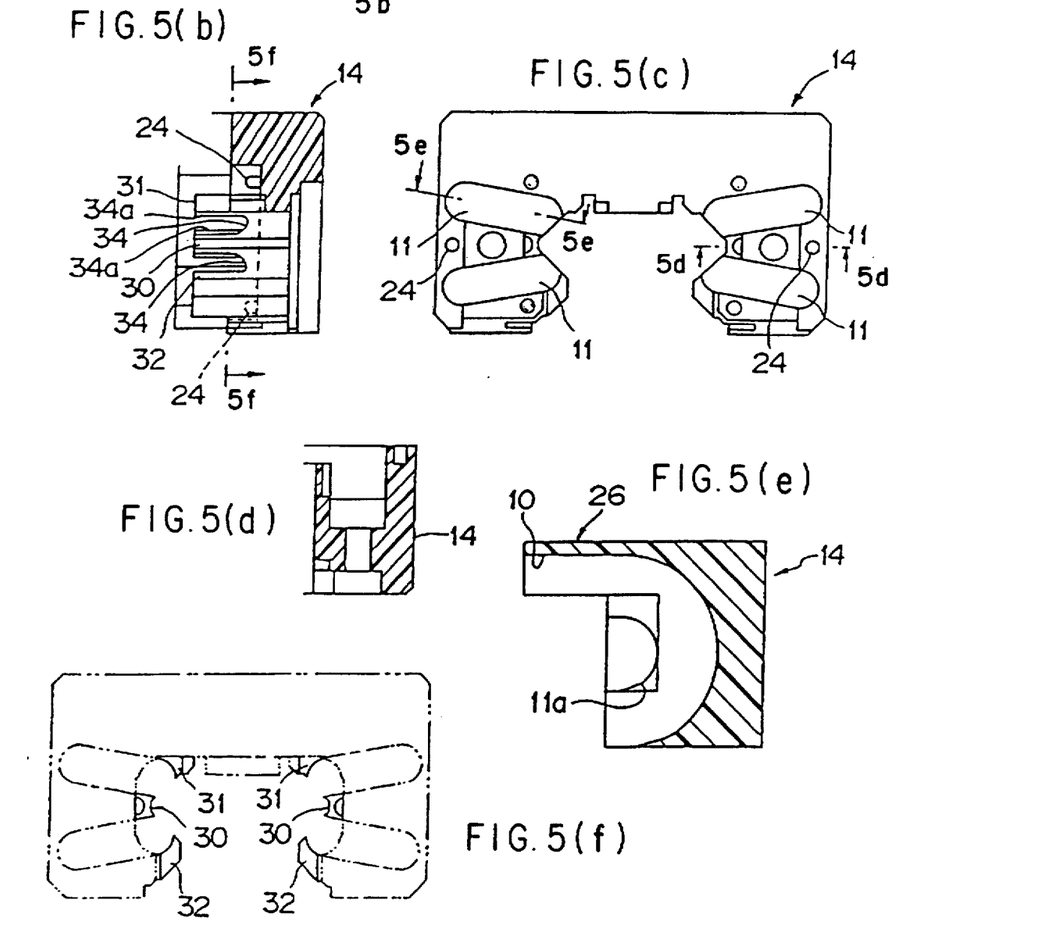
FIG. 5(b) is a sectional view taken along the line B—B of FIG. 5(a)
FIG. 5(c) is backside view.
FIG. 5(d) is a sectional view taken along the line D—D of FIG. 5(c)
FIG. 5(e) is a sectional view taken along the line E—E of FIG. 5(c) and FIG. 5(f) is a end view along the line F—F of FIG. 5(b).

Still furthermore, as shown in FIG. 3(d), a structure in which parallel two rows of the ball escape holes 10, 10 are connected with each other to prevent the balls 3 from clogging due to the presence of the lubrication agent. In this arrangement, the connection groove 10d acts as lubrication agent stay position so that the lubrication agent staying in front of the balls does not obstruct the rolling of the balls 3.

The ball escape hole 10 is formed so as to provide other various shapes in its section such as shown in FIGS. 3(h), (i) and (j) showing triangular shape, square shape and grooved circular shape, respectively. That is, in other words, it will be said that it is desired for the ball escape hole to have a non-circular section provided with a virtual circular section 10A as a rolling member passing section for passing the ball 3 as rolling member and a lubrication agent staying section 10B capable of storing the lubrication agent bled out from the virtual circular section 10A.

In the conventional drilling technology, it is impossible to form the ball escape hole having such section as mentioned above and such drilling working can be realized by the integral molding method according to the present invention.

Further, in order to make large the rotation radius of the ball in the direction changing passage 11, the both end portions of the ball escape hole forming portion is cut away at the outer peripheral portion of the ball escape hole 10 by a predetermined length, and according to the ball escape hole forming portion 15 of the above structure provided for the side cover 14, the cutout portion 27 is covered to thereby connect the end portion of the ball escape hole 10 with the end portion of the direction changing passage 11. That is, since the balls 3 can be circulated more smoothly by making possibly large the rotation radius of the direction changing passage, it will be not desired to adopt the structure having a small curvature.

The escape hole outer periphery forming portion 26 of the side cover 14 is formed with positioning projections 28 and the end surfaces of the cutout portions 27 formed to both the ends of the escape hole forming portions 15 of the mold forming member 12 are formed with positioning holes 29, which are engaged with the projections 28 with each other. According to this structure, the ball escape holes 10 and the ball direction changing passages 11 are surely positioned at their outer peripheral and inner peripheral sides, providing no staged portion at the joined portions. Since the connection portions between the ball escape holes 10 and the direction changing passages 11 are formed as continuous guide surfaces with no staged portion, the smooth circulation of the balls 3 can be ensured. Particularly, as shown in FIG. 3(e), it is desired for the ball escape hole 10 to have an annular tapered projection 10e and desired for the direction changing passage 11 to have a taper received portion 11e which is circumferentially entirely engaged with the tapered projection 10e as a faucet joint engagement. The tapered projection 10e and the taper receiving portion 11e are formed at the connection portion of the ball escape hole 10 and the direction changing passage 11. According to this structure, the ball escape hole 10 and the direction changing passage 11 can be substantially completely joined together.

The retainer 17 acts to hold the balls 3 to prevent the balls 3 from falling off from the movable block 2 when the guide rail 4 is drawn out from the movable block 2, and in the assembling state of the guide rail 4 and the movable block 2, the retainer 17 is designed in its dimension so that a gap is formed between the retainer 17 and the balls 3 so as not to obstruct the rolling motion of the balls rolling in the loaded ball passage 8.

In the described embodiment, the retainer 17 is disposed between the upper and lower two rows of loaded balls 3 formed to the bilateral leg portions 5, 5 and includes a first retainer section 30 for holding the lower edge portion of the ball 3 in the upper row of balls 3 and the upper edge portion of the ball 3 in the lower row of balls 3, a second retainer section 31 for holding the upper edge portion of the ball 3 of the upper row of balls 3 and a third retainer section 32 for holding the lower edge portion of the ball 3 of the lower row of balls 3. The upper ball row is held by the first and second retainer sections 30 and 31 and the lower ball row is held by the first and third retainer sections 30 and 32. The portions of the balls 3 are exposed between these first to third retainer sections 30, 31 and 32 and contact the ball rolling groove 8b on the guide rail side to be capable of freely rolling.

These retainer sections 30, 31 and 32 are integrally connected, at their both ends, with the end surface cover portion 16, and in the illustrated embodiment, the third retainer section 32 is integrally connected with the ball escape hole forming portions 15 of the bilateral leg portions 5, 5 of the block body 13 through the lower surface cover portion 33 covering the lower side surfaces of the leg portions 5, 5.

The connection between the ball direction changing passage 11 and the loaded ball passage 8 is done by the manner such that each of the balls 3 is scooped gradually at bilateral two points by a tongue piece 34 having a boat shape serving as a guide suitable for scooping the ball 3 by invading the loaded area, the tongue piece 34 being provided at the outer peripheral end portion of the direction changing passage of the side cover 14, thereby smoothly transferring the balls 3 to the direction changing passage 11 from the loaded ball passage 8. That is, as shown in FIG. 3(f), the tongue piece 34 is provided with a groove 34a having a width gradually reduced towards both the end portions, and as shown in FIG. 3(g), the ball 3 is supported at two points and the loaded ball 3 then rolls apart from the ball rolling groove 8b of the guide rail 4.

Accordingly, the ball 3 circulates to the direction changing passage 11 from the non-loaded ball hole 10 through the tapered projection and receiving portions 10e and 11e, then, to the loaded ball passage 8 in the loaded area through the boat shaped tongue piece 34, to the direction changing passage 11 at the end portion of the tongue piece 34 and again to the ball escape hole 10 through the tapered projection and receiving portions 10e and 11e, thus the balls 3 being circulated in a rolling state through this circulation route. Thus, the connection portions of these portions are not formed with no staged portion to thereby smoothly perform the circulation of the balls 3.

According to this structure, in which, as shown in FIG. 3(b), the ball escape hole 10 has at least three point contact structure by providing the guide projections 10b, 10c, the balls 3 roll from the two point contact state in the scooping operation of the boat bottom shaped tongue piece 34 to the three point contact structure, and an ideal ball rolling route can be established throughout the entire ball circulation passage, so that the balls 3 can be smoothly rolled therealong, and hence, generation of noise caused by unbalanced rolling of the balls 3 can be also minimized. In addition, since the idle ball rolling is also reduced, the noise can be minimized.

The movable block 2 of the rolling guide apparatus according to the present invention of the structure described above will be manufactured in the following manner.

A loaded ball rolling groove 8a is preliminarily formed to the block body 13, and the block body 13 is inserted into the mold 40 to integrally form the rolling member escape hole 10 to the block body 13 through the insertion molding process.

Figure 6A:
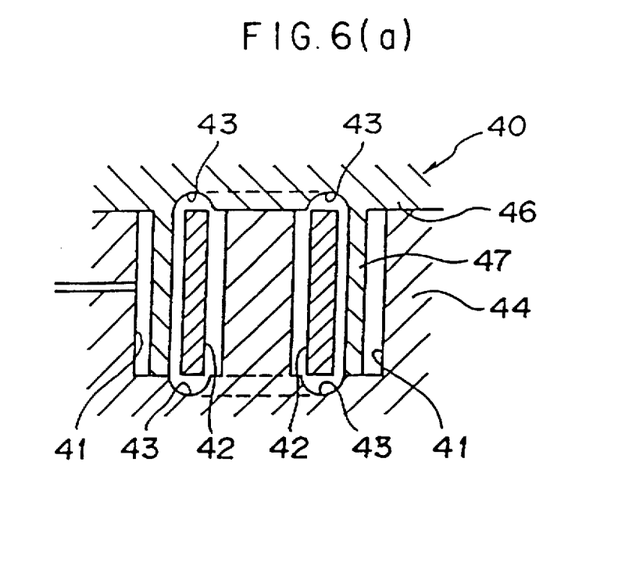
Figures 6B, 6C:
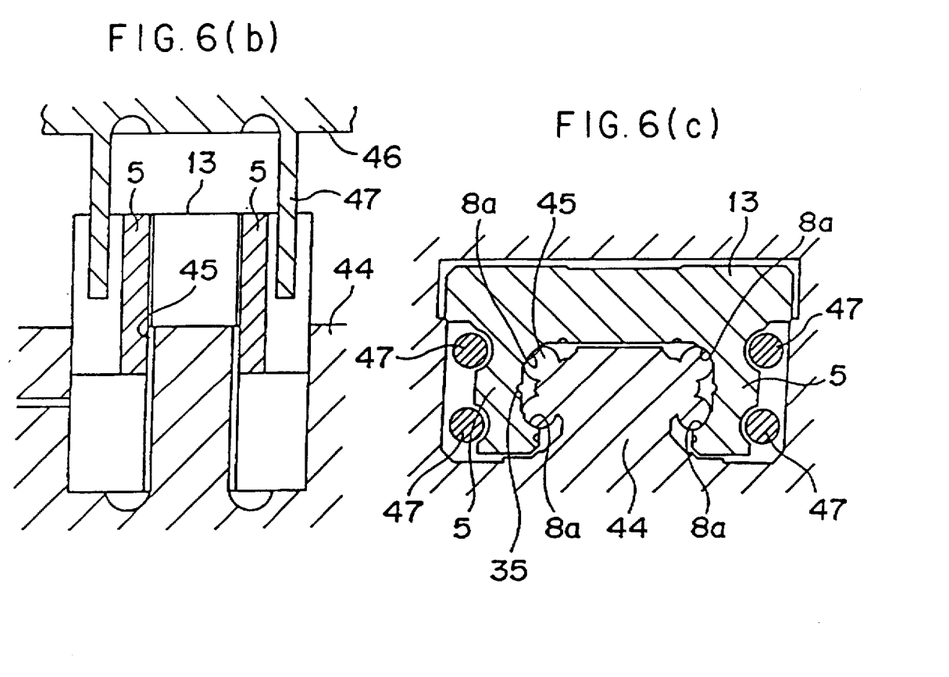

FIG. 6 shows a structure of the mold, which is formed with a cavity 41 for forming ball escape hole forming portions 15 outside the leg portions 5, 5, a cavity 42 for forming the retainers 17 inside the leg portions 5, 5 and a cavity 43 for forming the inner peripheral portions of the direction changing passages 19 at both longitudinal ends of the leg portions 5, 5. A stationary mold half 44 is provided with a protruded portion 45 to be fitted to the ball rolling groove 8a to position the same and a movable mold half 46 is provided with a pin 47 for forming the ball escape hole 10.

At the time of the insertion molding process, as shown in FIG. 6(c), the positioning inside the mold 40 is made with reference to the ball rolling groove 8a of the block body 13. According to this manner, when the insertion molding process is performed with reference to the ball rolling groove 8a, since the positioning of the ball escape hole 10 and the retainer 17 can be done, relative positional relationship among the loaded ball rolling passage 8, the direction changing passage 11 and the ball escape hole 10 can be accurately established.

In addition, at the time of the positioning in the mold 40 for the block body 13, if the positioning is performed with reference to the ball rolling groove 8a, the contact point to the block body 13 is minimally made to the ball rolling groove 8a and the other portions of the mold 40 are allowed to take non-contact arrangement and an accurate working is hence not required to these portions of the mold 40, resulting in easy manufacture thereof.

Furthermore, the inner peripheral portion 19 of the direction changing passage can be integrally formed with the block body 13 together with the ball escape hole 10 through the insertion molding process.

The retainer 17 can be also integrally formed with the block body 13 together with the ball escape hole formation portion 15 and the end surface covering portion 16 through the insertion molding process.

Thereafter, the direction changing passage 11 can be completed at both the end portions of the loaded ball rolling groove 8a by assembling the side covers 14.

According to the rolling guide apparatus of the structure described above, the ball escape hole forming portion 15 is integrally formed with the block body 13 as the mold forming body 12 through the insertion molding process, so that the drilling working for the ball escape hole 10 can be eliminated, thus making simple the manufacturing process.

Furthermore, since the integral molding can be realized through the molding process, any assembling process can be eliminated, thus reducing the assembling working.

Still furthermore, according to the present embodiment, the ball escape hole forming portion 15, the end surface covering portion 16 and the retainer 17 are integrally formed as the mold forming body 12, thus making more simple the manufacturing process.

According to the structure for enclosing the outer periphery of the block body 13, a tensile stress is applied, by the shrinkage of the mold forming body 12, to the retainer 17, the escape ball forming portion 15 and the end surface covering portion 16, and hence, the ball escape hole forming portion 15 and the retainer 17 are formed with high degree of straightness. Particularly, the ball 3 and the respective retainer sections are not contacted by the application of the tensile stress to the thin retainer sections for the upper side loaded ball and the lower side loaded ball, thus realizing smooth circulation of the balls 3.

However, in a case where the retainer 17 is formed of a resin material, there is a case of causing a shifting in position by temporary lowering of the tensile stress by a creeping phenomenon, and for such case, the joining surfaces of the first retainer section 30 of the retainer 17 and the block body 13 are formed with recesses and protrusions so as to be firmly joined together through the engagement of these recesses and protrusions. This engagement structure is composed of an engaging groove 35 formed to the joining surface of the block body 13 so as to extend entirely along the axial direction of the block body 13 and an engaging protrusion 36 fitted to the engaging groove 35. This engaging protrusion 36 is formed by invading the forming material into the groove 35 at the molding time. It will be of course noted that substantially the same engagement is realized to the joining surfaces between the second and third retainer sections 31, 32 and the block body 13.

Furthermore, according to the present embodiment, the thickness of the block constituting material such as metal constituting the block body 13 at its portion between the loaded ball rolling groove 8a to the ball escape hole 10 which affects on rigidity thereof can be made thin so as to provide an elastic property without changing the dimension between the ball rolling groove 8a and the ball escape hole 10, in other words, with the dimension suitable for the smooth direction changing operation being maintained, by forming the ball escape hole 10 by the resin molded body 12. The thin thickness of the block body will be performed by making large the thickness of the circular portion as shown with two-dot chain line a in FIG. 1(a) or by performing a linear cutting as shown with two-dot chain line b in FIG. 1(a).

Accordingly, if an assembling error between the guide rail 4 and the movable block 2 (for example, misalignment such as assembling error due to an error in parallelism between the fixing surface of the guide rail 4 and the fixing surface of a conveyer table to be fixed to the movable block 2) will be caused, such error can be absorbed through the flexibility of the thin leg portions of the block body 13 and the contact portion between the ball 3 and the ball rolling groove 8a is prevented from being applied by an excessive force.

The ball escape hole may be formed to a structure in which half of the ball escape hole 10 is integrally formed as shown in FIG. 3(k). In such case, an effect due to the thin thickness of the block body will be expected in comparison with the drilling working to the metal block though this effect may be small in comparison with the above embodiment.

Figure 7A:
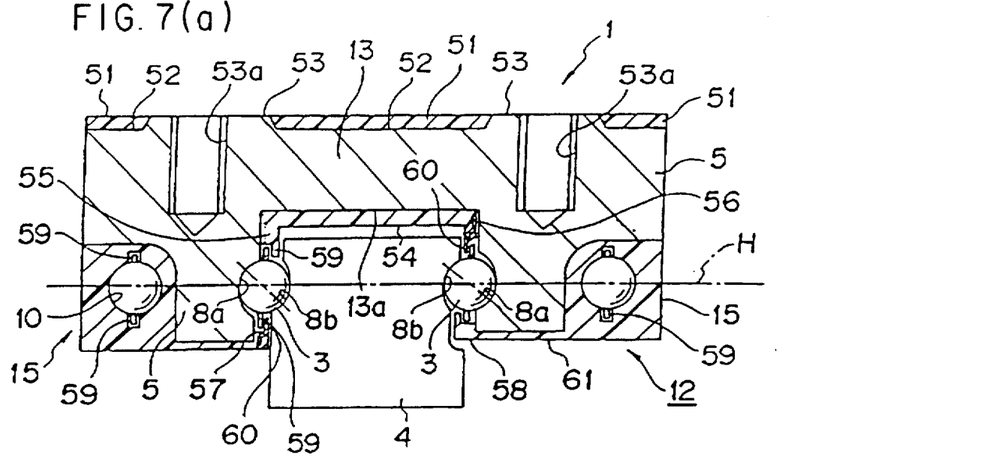
FIG. 7(a) is a vertical sectional view.
Figure 7B:
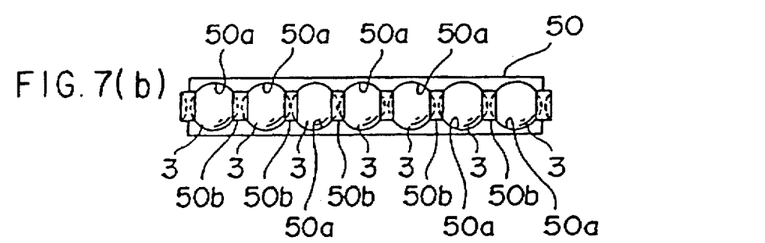
FIG. 7(b) is a view showing an endless type retainer and FIG. 7(c) is a plan view partially broken away.
Figure 7C:
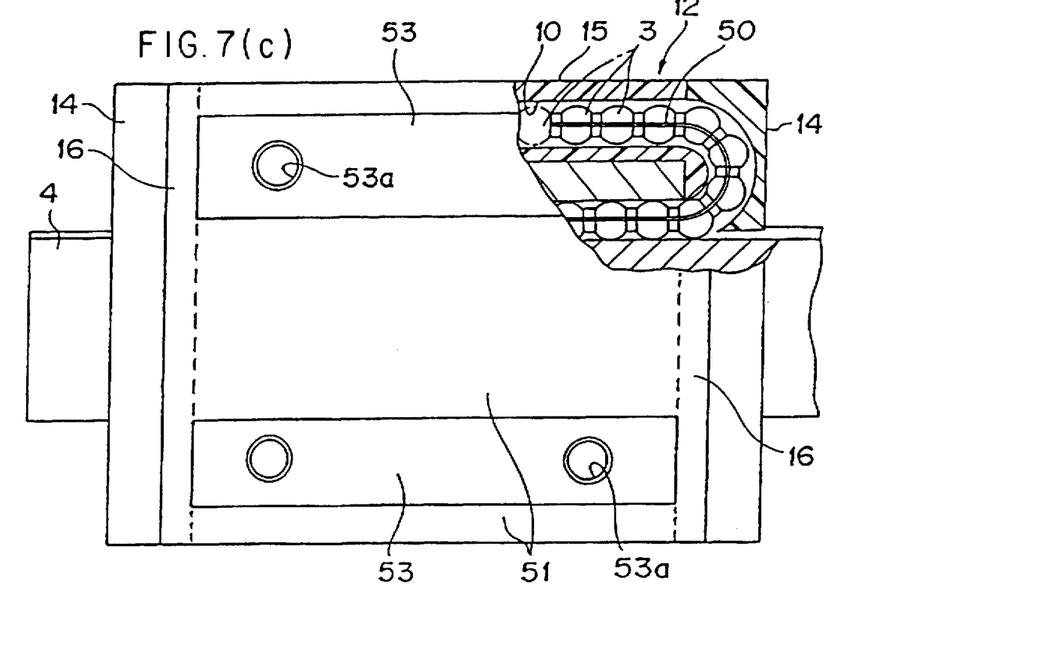

FIG. 7 represents another embodiment according to the present invention, in which like reference characters are added to elements or portions corresponding to those of the first mentioned embodiment and explanations thereof are omitted hereunder.

In this embodiment, one ball row is formed to each of bilateral leg portions 5 of the movable block 2, and the balls 3 are held by means of an endless retainer 50 as shown in FIG. 7(b).

The endless retainer 50 is a flexible belt-shaped member formed of a resin or like material, and a number of ball retaining holes 50a are formed with predetermined space from each other. The ball 3 is held by the inner peripheral surface of the respective ball retaining holes 50a to be freely rollable and slidable to thereby guide the balls along the entire periphery of the ball circulation passage 7. Spacers 50b, each having a recess of spherical crown shape corresponding to an outer spherical shape of the ball, are disposed between adjacent ball retaining holes 50a so as to squeeze the ball 3 from both axial sides of the retainer 50.

Since the endless retainer 50 is vibrated during the rolling motion of the balls 3, retainer support members 55 to 58 are disposed linearly along the loaded ball rolling passage 8 to suppress the vibration thereof, and a guide groove 60 is also formed to the ball escape hole 10 for guiding both side edges of the endless retainer 50.

In this embodiment of FIG. 7, the ball escape hole forming portion 15, the end surface covering portion 16 and the retainer support members 55 to 58 are formed integrally as the molded body 12. The contact line of the left side ball 3 is inclined downward towards the central portion of the guide rail 4 by a predetermined angle with respect to the horizontal line H, and the contact line of the right side ball 3 is inclined upward towards the central portion of the guide rail 4 by a predetermined angle with respect to the horizontal line H. Thus, these contact lines are substantially in parallel to each other. In an arrangement of a certain contact angle case, there may appear a case wherein each of the retainer support members has a portion having insufficient thickness, so that a reinforcing member 60 such as metal plate may be embedded to such portion as occasion demands. In the illustrated embodiment, the reinforcing members 60 such as metal plates are embedded in the right upper retainer support member 56 and the left lower retainer support member 57.

An upper surface covering portion 51 for covering the upper surface of the block body 13 and an inner peripheral surface covering portion 54 for covering the upper surface of the inner periphery of the central recessed portion 13a of the block body 13 are provided to the block body 13. These covering members 51 and 54 are formed integrally through the end surface covering portion 16 to thereby achieve the reinforcement of the block body 13 and the resin portion formed integrally with the block body 13. The inner peripheral surface covering portions 54 are formed integrally with the left upper retainer support member 55 and the right upper retainer support member 56. Lower surface covering portions 61 for covering the lower surfaces of the leg portions 5, 5 of the block body 13 are also integrally provided to the block body 13 and formed integrally with the left and right lower retainer support members 57 and 58.

The upper surface of the block body 13 has a low level surface portion 52 and a high level surface portion 53 having a surface level higher than that of the lower level surface portion 52, and the high level surface portion 53 is formed as a bearing surface formed with a bolt hole 54 through which a fixing bolt is inserted for clamping, whereby the upper surface covering portion 51 is covered over the lower level surface portion 52 to make equal the surface level to that of the high level surface portion 53, providing a flat surface of the block body 13. In this embodiment, two high level surface portions 53 are provided in correspondence to the left and right leg portions 5, 5 of the block body 13, and three low level surface portions 52 are provided at an intermediate portion between the two high level surface portions 53 and at bilateral both end portions of the block body 13.

Figure 8A:
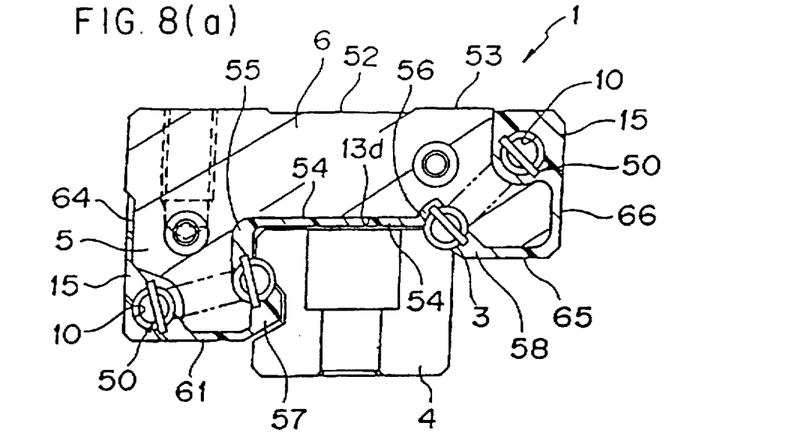
FIG. 8(a) is a vertical sectional view.
Figure 8B:
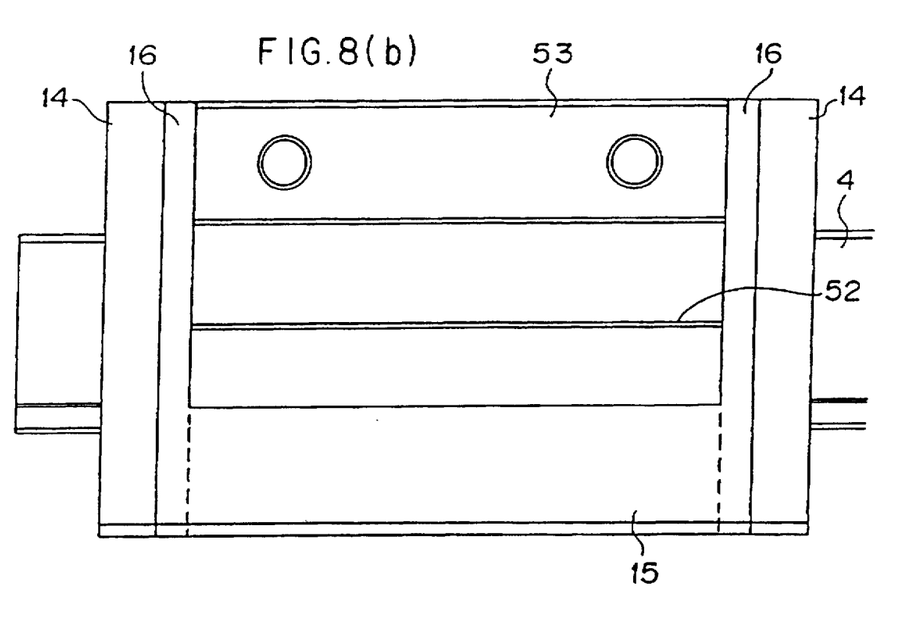
FIG. 8(b) is a plan view and FIG. 8(c) is a view showing the retainer.
Figure 8C:
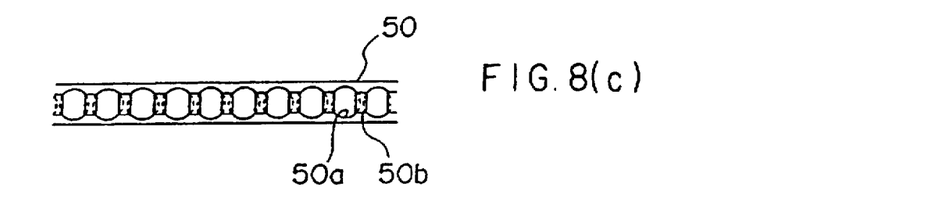

FIG. 8 shows an example of a structure which utilizes the endless retainer 50 described above.

In this example, the levels in arrangements of the left and right balls 3 are made different in a manner such that one of the ball rows is arranged to the right side edge of the upper surface of the guide rail 4 and the other one of the ball rows is arranged to the intermediate portion of the left side surface of the guide rail 4. The block body 13 is formed to have substantially an L-shape in section having one leg portion 5, and one of the ball escape holes 10 is formed to the right side portion of the upper surface of the horizontal portion 6 of the block body 13 and the other one of the ball escape holes 10 is formed to the leg portion 5. That is, a cutout 62 is formed to the right edge portion of the upper surface of the horizontal portion 6 of the block body 13, and the ball escape hole forming portion 15 formed of the resin material is integrally joined with the cutout 62 and the other ball escape hole forming portion 15 is integrally joined with a cutout 63 formed to the lower surface of the leg portion 5 and the corner portion of the left side surface thereof.

The left side surface covering portion 64 of the leg portion 5 and the left upper retainer support member 55 disposed to the inner periphery of the leg portion 5 are formed integrally through the front and rear end surface covering portions 16 so as to surround the leg portion 5. The inner side edge portion of the lower surface covering portion 61 for covering the lower surface of the leg portion 5 is integrally joined with the retainer support member 57 at the left side ball lower side edge portion. The escape ball hole forming portion 15 formed to the horizontal portion 6 and the lower surface covering portion 65 of the horizontal portion 6 are integrally joined together through the front and rear end surface covering portions 16 so as to vertically surround the horizontal portion 6. The lower surface covering portion 65 and the ball escape hole forming portion 15 are integrally formed through the right side surface covering portion 65 of the block body 13, and the inner side edge portion of the lower surface covering portion 65 is joined with the retainer support member 58 for the right lower ball row.

As described above, with the structure of the block body 13, only the portions necessary for the positioning are exposed and portions not required to form with high precision are covered with resin materials, so that portions of the block body 13 requiring cut working or the like are reduced, thus reducing manufacturing cost.

FIG. 9 shows a further example of arrangement of the present invention, in which like reference numerals are added to elements or portions corresponding to those of the former examples and explanations thereof are omitted herein.

Figure 9A:
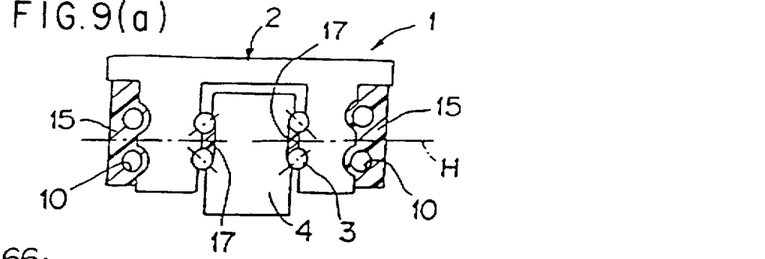
FIGS. 9(a) to (g) represent structures of various types of the rolling guide apparatus of the present invention.

FIG. 9(a) shows a structural example of the linear motion guide apparatus provided with four rows of ball circulation passages 7 as like the above first embodiment, in which the ball escape hole 10, the inner peripheral portion of the direction changing passage and the retainer 17 are integrally formed. This example differs from the former one in that the contact angle lines to the bilateral upper and lower two ball rows are opened towards the guide rail 4 with respect to the horizontal line.

In the illustrated embodiment, one retainer 17 is disposed between each of bilateral upper and lower ball rows.

Figure 9B:
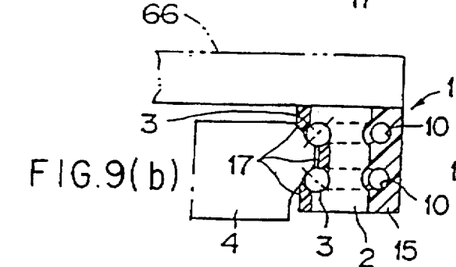

An example shown in FIG. 9(b) has a structure in which the left and right leg portions such as shown in the embodiment of FIG. 1 are independently separated and which is utilized for conveying and guiding a table 66 or the like by using a pair of linear motion guide apparatus. In this structure, the ball escape hole 10, the direction changing passage inner peripheral surface 19 and the retainer 17 are also integrally formed.

Figure 9C:
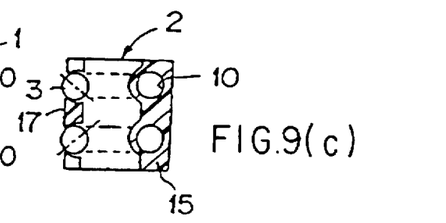

An example shown in FIG. 9(c) has a structure in which the left and right leg portions 5 of the linear motion guide apparatus such as shown in FIG. 9(b) are independently separated. In this structure, the ball escape hole 10, the direction changing passage inner peripheral portion 19 and the retainer 17 are also integrally formed.

Figures 9D, 9E, 9F:
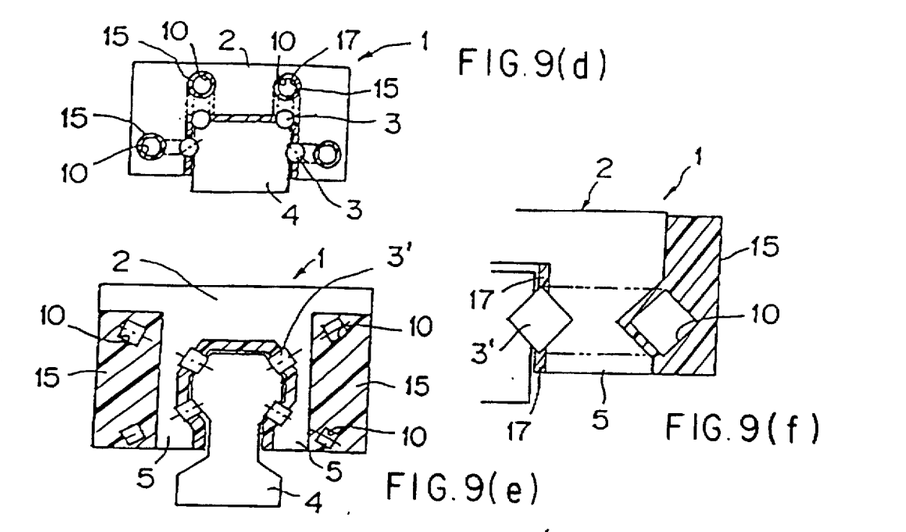

An example shown in FIG. 9(d) represents a structure of a linear motion guide apparatus provided with four ball rows including two rows formed to the upper surface of the guide rail 4 and respective one row formed to left and right side surfaces thereof, and in this arrangement, the ball escape hole 10, the direction changing passage inner peripheral portion 19 and the retainer 17 are integrally formed together.

In this example, the ball escape hole forming portion 15 of the molded body 12 is fitted in a lower hole 67 formed through the block body 13.

In such arrangement, however, high precision is not basically required with respect to the lower hole 67 to be formed to the block body 13, thus easily forming the same.

Figure 9G:
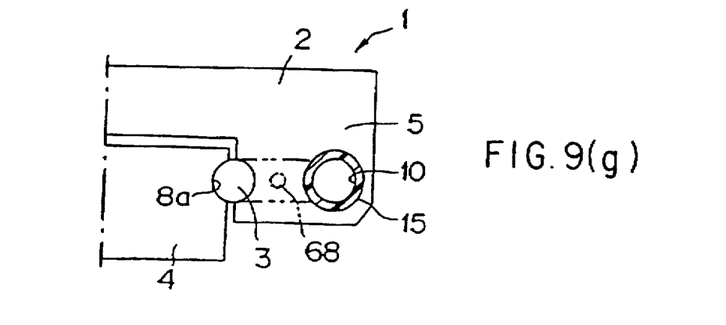

FIG. 9(g) is an example employing the structure of the lower hole 67 to the left and right two ball rows, and particularly, in this example, no retainer is provided and an engaging portion 68 performing recess-protrusion engagement for preventing the positional shifting is formed to the end surface of the block body 13 at the direction changing passage inner peripheral portion.

FIGS. 9(e) and 9(f) show examples of arrangements of the linear motion guide apparatus in which rollers 3' are used instead of the balls 3, and FIG. 9(e) shows a linear motion guide apparatus provided with four roller rows and FIG. 9(f) shows a linear motion guide apparatus provided with two roller rows.

With respect to the above examples, it is to be noted that the present invention is described with reference to the linear motion guide apparatus, but it is of course applicable to a linear guide rail slidably assembled with a curved motion guide rail, and as the molded body, a die cast product, sintered metal or the like other than resin material may be utilized.

According to the present invention having the structures and functions mentioned hereinbefore, since the rolling member escape holes are integrally formed with the block body through the molding process, the drilling working can be eliminated to thereby easily form the structure.

In addition, since the integral structure can be provided through the molding process, the assembling process can be reduced.

The degree of integral formation can be increased by integrally forming the inner peripheral portion of the direction changing passage with the ball escape hole, making easy the assembling process.

By integrally forming the rolling member escape hole, the inner peripheral portion of the direction changing passage and the retainer to surround the periphery of the block body, the tensile stress is applied, by the shrinkage of the molded portions, to the rolling member escape hole, the inner peripheral portion of the direction changing passage and the retainer, so that the degree of straightness of the rolling member escape hole and the retainer can be made high, and the generation of resonance noise, at the time of rolling member circulation, to the respective parts of the guide apparatus by residual tensile stress can be prevented.

The low noise frequency due to the rolling member circulation can be prevented from causing by the increasing of vibration frequency including mass of the block body.

Furthermore, the thickness of the block constituting material such as metal constituting the block body at its portion between the loaded rolling member rolling groove to the rolling member escape hole which affects on rigidity thereof can be made thin so as to provide an elastic property without changing the dimension between the rolling member rolling groove and the rolling member escape hole, in other words, with the dimension suitable for the smooth direction changing operation being maintained, by forming the rolling member escape hole by the molded resin body. Accordingly, if an assembling error between the guide rail and the movable block (for example, misalignment such as assembling error due to an error in parallelism between the fixing surface of the guide rail and the fixing surface of a conveyer table to be fixed to the movable block) be caused, such error can be absorbed through the flexibility of the thin portions of the block body and the contact portion between the rolling member and the rolling member rolling groove is prevented from being applied with an excessive force.

The rolling member escape hole is formed so as to provide a sectional shape having a rolling member passing section along which the rolling members roll and a lubrication agent storing section capable of storing lubrication agent bled outward from the rolling member passing section, and according to such structure of the rolling member escape hole, since the lubrication agent can be retained without obstructing the circulating motion of the rolling member, the smooth circulating motion thereof can be surely maintained for the long time operation with no substantial maintenance.

Furthermore, the escape hole having such complicated sectional shape can be easily formed through the molding process.

The positioning of the block body inserted into the mold is performed with reference to the rolling member rolling groove through the insertion molding process, and accordingly, since the position of the rolling member escape hole and the position of the retainer can be determined with reference to the rolling member rolling groove, the relative positional relationship among the loaded rolling member rolling passage, the direction changing passage and the escape hole constituting the rolling member circulation passage can be exactly determined. Accordingly, no staged portion is formed to the connection portion between the loaded rolling member rolling passage, the inner peripheral portion of the direction changing passage and the rolling member escape hole, thus smoothly circulating the rolling members.

Furthermore, when the position of the block body in the mold is determined, the contacting portion of the mold to the block body is minimally limited to the rolling member rolling groove by positioning it with reference to the rolling member rolling groove, and the other portions of the mold can be maintained with non-contact state, which requires no precise working, thus easily performing manufacturing process.

We claim:

1. A rolling guide apparatus in which a movable block is supported to be movable along a guide rail through a number of rolling members, a circulation passage for guiding circulation of the rolling members is formed to the movable block, said rolling member circulation passage being composed of a loaded rolling member rolling passage in a loaded area between loaded rolling member rolling grooves formed to opposing surfaces of the movable block and the guide rail and a non-loaded return passage for returning the rolling members in the loaded area from one end of the loaded rolling member rolling passage to another one end thereof, said return passage being composed of a rolling member escape hole extending in parallel to said loaded rolling member rolling passage and a direction changing passage having inner and outer peripheral portions connecting both ends of the rolling member escape hole to both ends of the loaded rolling member rolling passage,
   said rolling guide apparatus being characterized in that at least one of said rolling member escape hole, said inner peripheral portion of the direction changing passage and a retainer extending along the loaded rolling member rolling passage is formed of a molded body and said molded body is integrally formed with a block body having high rigidity.

2. A rolling guide apparatus according to claim 1, wherein said molded body is provided with the rolling member escape hole and the inner peripheral portion of the direction changing passage integrally connected to the rolling member escape hole and joined with both end surfaces of the block body.

3. A rolling guide apparatus according to claim 1, wherein said molded body is provided with the rolling member escape hole and the retainer extending along the loaded rolling member rolling passage.

4. A rolling guide apparatus according to claim 1, wherein said molded body is provided with the inner peripheral portion of the direction changing passage joined with both end surfaces of the block body and the retainer extending along the loaded rolling member rolling passage and integrally connected at its both ends with the inner peripheral portion of the direction changing passage.

5. A rolling guide apparatus according to claim 1, wherein said molded body is provided with the rolling member escape hole, the inner peripheral portion of the direction changing passage integrally connected to the rolling member escape hole and joined with both end surfaces of the block body and the retainer extending along the loaded rolling member rolling passage and integrally connected at its both ends with the inner peripheral portion of the direction changing passage, said molded body having a closed sectional shape surrounded by said rolling member escape hole, said direction changing passage and said retainer.

6. A rolling guide apparatus according to any one of claims 1, 2, 3, 4 and 5, wherein recess-protrusion engaging portion is formed to joining surfaces of the molded body and the block body.

7. A rolling guide apparatus according to any one of claims 1, 2, 3, 4 and 5, wherein said molded body is formed of a resin material, and a portion between the loaded rolling member rolling groove and the rolling member escape hole of the movable block is formed as one portion of the resin molded body so as to define a reduced thickness in the high rigid block body to provide an elastic property.

8. A rolling guide apparatus according to any one of claims 1, 2, 3, 4 and 5, wherein the rolling members rolling in the loaded rolling member rolling passage are scooped by a guide, each in two point contact state, extending in the loaded area of the direction changing passage from the loaded rolling member rolling groove to the direction changing passage in a manner of being separated gradually apart from each other.

9. A rolling guide apparatus according to any one of claims 1, 2, 3, 4 and 5, wherein the movable block is provided with a pair of leg portions between which the guide rail is interposed and a connection portion connecting said leg portions, and the rolling member circulation passages are formed to said leg portions.

10. A rolling guide apparatus according to claim 9, wherein a covering portion is provided for covering at least one of upper and lower surfaces of the connection portion of the movable block and said covering portion is integrally formed with the inner peripheral portion of the direction changing passage joined with both the end surfaces of the block body.

11. A rolling guide apparatus according to any one of the preceding claims 1 to 5, wherein said rolling member escape hole has a sectional shape having a rolling member passing section through which the rolling member passes and a lubrication agent storing section capable of storing a lubrication agent bled outward from the rolling member passing section.

12. A method of manufacturing a movable block, which is supported to be movable with respect to a guide rail through a number of rolling members, of a rolling guide apparatus provided with loaded rolling member rolling grooves formed to opposing surfaces of the movable block and the guide rail, a rolling member escape hole extending in parallel to the loaded rolling member rolling grooves, and a direction changing passage having inner and outer peripheral portions connecting both ends of the rolling member escape hole to both ends of the loaded rolling member rolling passage, said manufacturing method being characterized in that said block body is placed in a mold, and at least one of said rolling member escape hole, said inner peripheral portion of the direction changing passage and a retainer extending along the loaded rolling member rolling passage is formed integrally with the block body through an insertion molding process.

13. A movable block manufacturing method according to claim 12, wherein the rolling member escape hole and the inner peripheral portion of the direction changing passage are integrally formed together through the insertion molding process.

14. A movable block manufacturing method according to claim 12, wherein the rolling member escape hole and the retainer extending along the loaded rolling member rolling passage are integrally formed together through the insertion molding process.

15. A movable block manufacturing method according to claim 12, wherein the inner peripheral portion of the direction changing passage and the retainer extending along the loaded rolling member rolling passage are integrally formed together through the insertion molding process.

16. A movable block manufacturing method according to claim 12, wherein the rolling member escape hole, the inner peripheral portion of the direction changing passage, and the retainer extending along the loaded rolling member rolling passage are integrally formed together through the insertion molding process.

17. A movable block manufacturing method according to any one of claims 12 to 16, wherein said block body is positioned in the mold with reference to the rolling member rolling groove formed to the movable block.

* * * * *